United States Patent
Tajiri

(10) Patent No.: US 9,432,656 B2
(45) Date of Patent: Aug. 30, 2016

(54) IMAGE CAPTURING DEVICE INCLUDING LENS ARRAY AND PROCESSING

(71) Applicant: Sony Corporation, Tokyo (JP)

(72) Inventor: Shinichiro Tajiri, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/310,116

(22) Filed: Jun. 20, 2014

(65) Prior Publication Data

US 2014/0300705 A1 Oct. 9, 2014

Related U.S. Application Data

(63) Continuation of application No. 13/339,949, filed on Dec. 29, 2011, now Pat. No. 8,842,201.

(30) Foreign Application Priority Data

Jan. 6, 2011 (JP) ................. 2011-001401

(51) Int. Cl.
*H04N 5/225* (2006.01)
*H04N 13/02* (2006.01)
*H04N 13/00* (2006.01)

(52) U.S. Cl.
CPC ........ *H04N 13/0282* (2013.01); *H04N 5/2254* (2013.01); *H04N 5/2259* (2013.01); *H04N 13/0011* (2013.01); *H04N 13/0022* (2013.01);
(Continued)

(58) Field of Classification Search
CPC ................. H04N 13/0282; H04N 13/02017; H04N 13/0033; H04N 13/0232; H04N 5/2259; H04N 13/0022; H04N 5/2254

USPC .......... 348/239, 222.1, 335, 345, 369, 393.1
See application file for complete search history.

(56) References Cited

U.S. PATENT DOCUMENTS

| 6,084,979 A * | 7/2000 | Kanade ............. H04N 13/0022 345/424 |
| 7,745,772 B2 | 6/2010 | Utagawa |
| 7,916,204 B2 | 3/2011 | Wells et al. |

(Continued)

FOREIGN PATENT DOCUMENTS

| CN | 101656835 A | 2/2010 |
| CN | 101662694 A | 3/2010 |

(Continued)

OTHER PUBLICATIONS

Ng, Ren et al., "Light field photography with a hand-help plenoptic camera", Stanford Tech Report, CTSR Feb. 2005.
(Continued)

*Primary Examiner* — Hung Lam
(74) *Attorney, Agent, or Firm* — Chip Law Group

(57) ABSTRACT

Disclosed herein is an image pickup apparatus, including: an image pickup lens; a lens array disposed on an image formation plane of the image pickup lens; an image pickup device adapted to receive a light ray passing through the image pickup lens and the lens array to acquire picked up image data; and an image processing section adapted to carry out an image process for the picked up image data; the image processing section including a viewpoint image production section adapted to produce a plurality of viewpoint images based on the picked up image data, and an image synthesis processing section adapted to synthesize two or more viewpoint images from among the viewpoint images.

9 Claims, 12 Drawing Sheets

(52) U.S. Cl.
CPC ...... *H04N 13/0033* (2013.01); *H04N 13/0217* (2013.01); *H04N 13/0232* (2013.01)

(56) References Cited

U.S. PATENT DOCUMENTS

| | | |
|---|---|---|
| 8,400,555 B1 | 3/2013 | Georgiev et al. |
| 2004/0257460 A1 | 12/2004 | Kuriyama |
| 2006/0232584 A1 | 10/2006 | Utsugi et al. |
| 2006/0256259 A1 | 11/2006 | Takagi et al. |
| 2006/0289956 A1 | 12/2006 | Boettiger et al. |
| 2008/0151378 A1 | 6/2008 | Kim |
| 2008/0211737 A1 | 9/2008 | Kim et al. |
| 2009/0244268 A1 | 10/2009 | Masuda et al. |
| 2010/0026852 A1 | 2/2010 | Ng et al. |
| 2010/0045844 A1 | 2/2010 | Yamamoto et al. |
| 2010/0194921 A1 | 8/2010 | Yoshioka |
| 2010/0283863 A1* | 11/2010 | Yamamoto .......... G02B 27/0075 348/222.1 |
| 2010/0309201 A1* | 12/2010 | Lim ........................ G06T 5/002 345/419 |
| 2011/0090311 A1 | 4/2011 | Fang et al. |
| 2011/0273531 A1 | 11/2011 | Ito et al. |
| 2012/0069009 A1* | 3/2012 | Shimoyama ......... H04N 13/026 345/419 |
| 2012/0176506 A1 | 7/2012 | Tajiri |
| 2012/0229688 A1 | 9/2012 | Tajiri |

FOREIGN PATENT DOCUMENTS

| | | |
|---|---|---|
| CN | 101888481 A | 11/2010 |
| CN | 101902657 A | 12/2010 |
| EP | 2 150 065 A2 | 2/2010 |
| JP | 61-048287 | 3/1986 |
| JP | 05-76234 B2 | 10/1993 |
| JP | 7-8055 B2 | 1/1995 |
| JP | 3182009 B2 | 4/2001 |
| JP | 2007-004471 A | 1/2007 |
| JP | 2010-057067 A | 3/2010 |
| WO | WO 2006/039486 | 4/2006 |
| WO | WO 2006/066081 A1 | 6/2006 |
| WO | WO 2010/090150 | 8/2010 |

OTHER PUBLICATIONS

Office Action Received for European Patent Application No. 11194456.7, Mailed on Jan. 15, 2016, pp. 5.

* cited by examiner

FIG.6A

| A | A | A |
|---|---|---|
| A | A | A |
| A | A | A |

FIG.6B

| B | B | B |
|---|---|---|
| B | B | B |
| B | B | B |

FIG.6C

| C | C | C |
|---|---|---|
| C | C | C |
| C | C | C |

FIG.6D

| D | D | D |
|---|---|---|
| D | D | D |
| D | D | D |

FIG.6E

| E | E | E |
|---|---|---|
| E | E | E |
| E | E | E |

FIG.6F

| F | F | F |
|---|---|---|
| F | F | F |
| F | F | F |

FIG.6G

| G | G | G |
|---|---|---|
| G | G | G |
| G | G | G |

FIG.6H

| H | H | H |
|---|---|---|
| H | H | H |
| H | H | H |

FIG.6I

| I | I | I |
|---|---|---|
| I | I | I |
| I | I | I |

FIG.12A
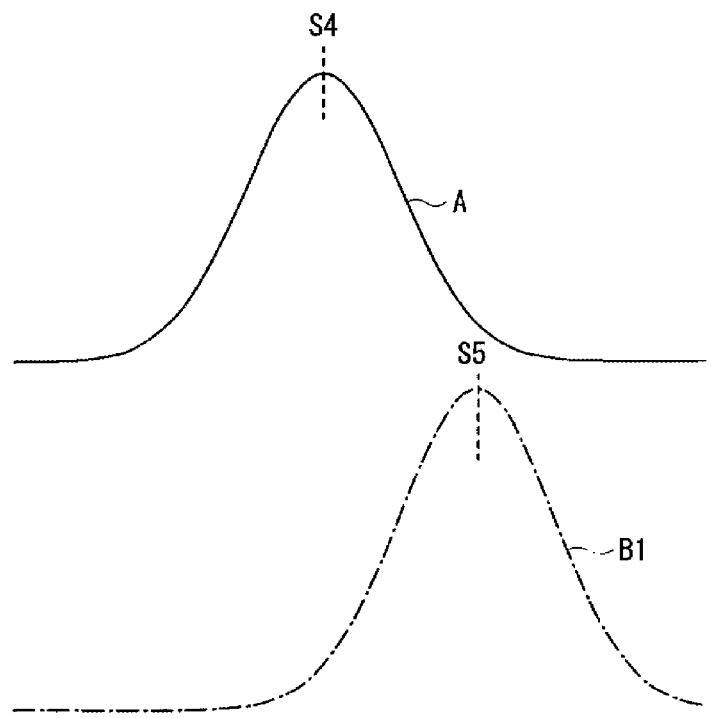
FIG.12B
FIG.12C
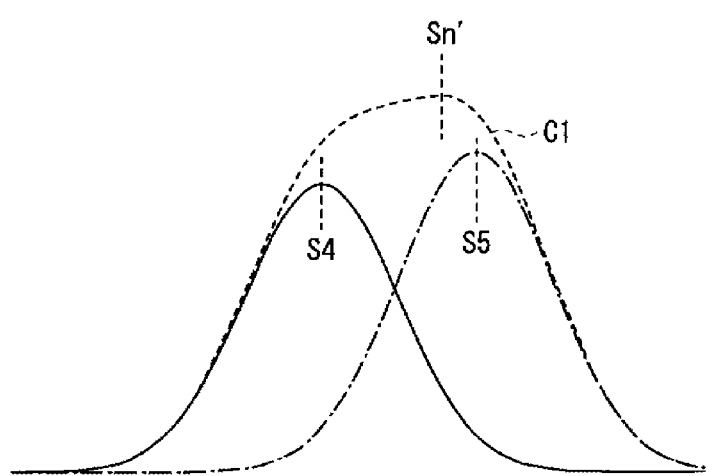

+

⇩

IMAGE CAPTURING DEVICE INCLUDING LENS ARRAY AND PROCESSING

CROSS REFERENCES TO RELATED APPLICATIONS

This application is a continuation of and claims the benefit under 35 U.S.C. §120 of U.S. patent application Ser. No. 13/339,949, filed on Dec. 29, 2011, which claims the benefit under 35 U.S.C. §119 of Japanese Patent Application JP 2011-001401, filed on Jan. 6, 2011. The entire contents of these applications are hereby incorporated by reference herein in their entireties.

BACKGROUND

The technology disclosed herein relates to an image pickup apparatus and an image processing method wherein a lens array is used.

Various image pickup apparatus have been proposed and developed and are disclosed in, for example, PCT Patent Publication No. WO06/039486, Japanese Patent Publication No. Hei 5-76234, Japanese Patent Publication No. Hei 7-8055, and Japanese Patent No. 3182009 as well as Ren Ng, and seven others, "Light Field Photography with a Hand-Held Plenoptic Camera," Stanford Tech Report CTSR 2005-02. Also an image pickup apparatus in which a predetermined image process is carried out for picked up image data and resulting data are outputted has been proposed. For example, in the first-mentioned patent document and the non-patent document mentioned above, an image pickup apparatus which uses a method called "Light Field Photography" is disclosed. In the image pickup apparatus, a lens array is disposed on a focal plane of an image pickup lens and an image sensor is provided on a focal plane of the lens array. Consequently, it is possible for the image sensor to receive a video of an image pickup object formed on the lens array while dividing the video into rays of light in various viewpoint directions and acquire multi-viewpoint images at the same time.

SUMMARY

In such an image pickup apparatus as described above, a plurality of pixels on the image sensor are allocated to one lens in the lens array, in which the dimensions in the vertical and horizontal directions of the lenses are equal to integral multiples of a pixel pitch. Further, a number of viewpoint images equal to the number of pixels allocated to the lens can be acquired. For example, where one lens is allocated to 3×3 pixels in which the vertical and horizontal dimensions of the lens are equal to pitches per three pixels, images at three viewpoints in the vertical direction and the horizontal direction can be acquired. Consequently, images per totaling nine viewpoints can be acquired. By displaying, for example, two left and right viewpoint images from among the viewpoint images acquired in such a manner as described above using a predetermined display unit, for example, a stereoscopic image display can be implemented.

However, upon stereoscopic image display, depending upon the displayed image, the parallax amount between the left and right viewpoint images becomes excessively great until it exceeds the stereoscopic perceptual limitation of the human being. If the stereoscopic perceptual limitation is exceeded in this manner, then two viewpoint images are recognized as double images. In this instance, since there is the possibility that, if such an image as described above is viewed continuously, then eyestrain or the like may be caused, implementation of a method for reducing the influence of such an excessively great parallax as described above on the visibility is desired.

On the other hand, in Japanese Patent Publication No. Hei 5-76234 mentioned hereinabove, a method is disclosed in which image pickup is carried out in a state in which a diaphragm condition is changed for each of picked up images to produce blurring, that is, to gradate a contour, to moderate the influence of the double images. However, in the method, since the diaphragm condition is different for each of images, the method is less likely to be ready for a moving picture. Further, in Japanese Patent Publication No. Hei 7-8055, a technique is disclosed in which the picture quality of a defocused image of an image pickup object of a stereoscopic video is degraded. Further, in Japanese Patent No. 3182009, a process for calculating an average of pixels around a noticed pixel is carried out to form blurring.

Therefore, it is desirable to provide an image pickup apparatus by which a viewpoint image with which good visibility is achieved upon stereoscopic image display can be acquired.

According to an embodiment of the disclosed technology, there is provided an image pickup apparatus including an image pickup lens, a lens array disposed on an image formation plane of the image pickup lens, an image pickup device adapted to receive a light ray passing through the image pickup lens and the lens array to acquire picked up image data, and an image processing section adapted to carry out an image process for the picked up image data, the image processing section including a viewpoint image production section adapted to produce a plurality of viewpoint images based on the picked up image data, and an image synthesis processing section adapted to synthesize two or more viewpoint images from among the viewpoint images.

In the image pickup apparatus, a light lay from an image pickup object passing through the image pickup lens is divided for individual viewpoint directions by the lens array and received by the image pickup device, by which picked up image data are obtained. The image processing section produces a plurality of viewpoint images based on the obtained picked up image data and synthesizes two or more of the viewpoint images. The viewpoint image after the synthesis exhibits a state in which the position thereof is shifted and the viewpoint and a further defocused state like an image having a blurred contour.

According to another embodiment of the disclosed technology, there is provided an image processing method including acquiring picked up image data from an image pickup device which receives a light ray passing through an image pickup lens and a lens array disposed on an image formation plane of the image pickup lens, producing a plurality of viewpoint images based on the picked up image data, and synthesizing two or more viewpoint images from among the plural viewpoint images.

With the image pickup apparatus, the image processing section synthesizes two or more viewpoint images. Consequently, while the position of a certain one of the viewpoint images is shifted, the contour or the viewpoint image can be blurred. Therefore, for example, when two left and right viewpoint images after the synthesis are used to carry out stereoscopic video display, such an excessively great parallax as exceeds the perceptual limitation of the human being can be reduced to moderate the eyestrain and so forth by an effect by parallax amount suppression and blurring of the viewpoint images. In other words, a viewpoint image which achieves good visibility upon stereoscopic video display can be acquired.

In the image processing method, picked up image data are acquired from the image pickup device which receives a light ray passing through the image pickup lens and the lens array disposed on the image formation plane of the image pickup lens. Then, a plurality of viewpoint images are produced based on the picked up image data, and two or more viewpoint images from among the plural viewpoint images are synthesized. Consequently, for example, when two left and right viewpoint images after the synthesis are used to carry out stereoscopic video display, such an excessively great parallax as exceeds the perceptual limitation of the human being can be reduced to moderate the eyestrain and so forth by an effect by parallax amount suppression and blurring of the viewpoint images. In other words, a viewpoint image which achieves good visibility upon stereoscopic video display can be acquired.

BRIEF DESCRIPTION OF THE DRAWINGS

FIGS. 6A to 6I are schematic views illustrating viewpoint image data obtained from the image pickup data illustrated in FIG. 5;

FIGS. 12A to 12C are schematic views illustrating appearances in the case where the ratio is changed to carry out the synthesis process for viewpoint images by the image pickup apparatus of FIG. 1;

DETAILED DESCRIPTION OF THE PREFERRED EMBODIMENT

In the following, an embodiment of the technology disclosed herein is described in detail with reference to the accompanying drawings. It is to be noted that the disclosed technology is described in the following order:
1. Embodiment (example wherein a synthesis process of viewpoint images is carried out collectively on an image plane)
2. Modification (example wherein a synthesis process is carried out for each selective region on an image plane in response to depth information)

Embodiment

General Configuration

Figure 1:
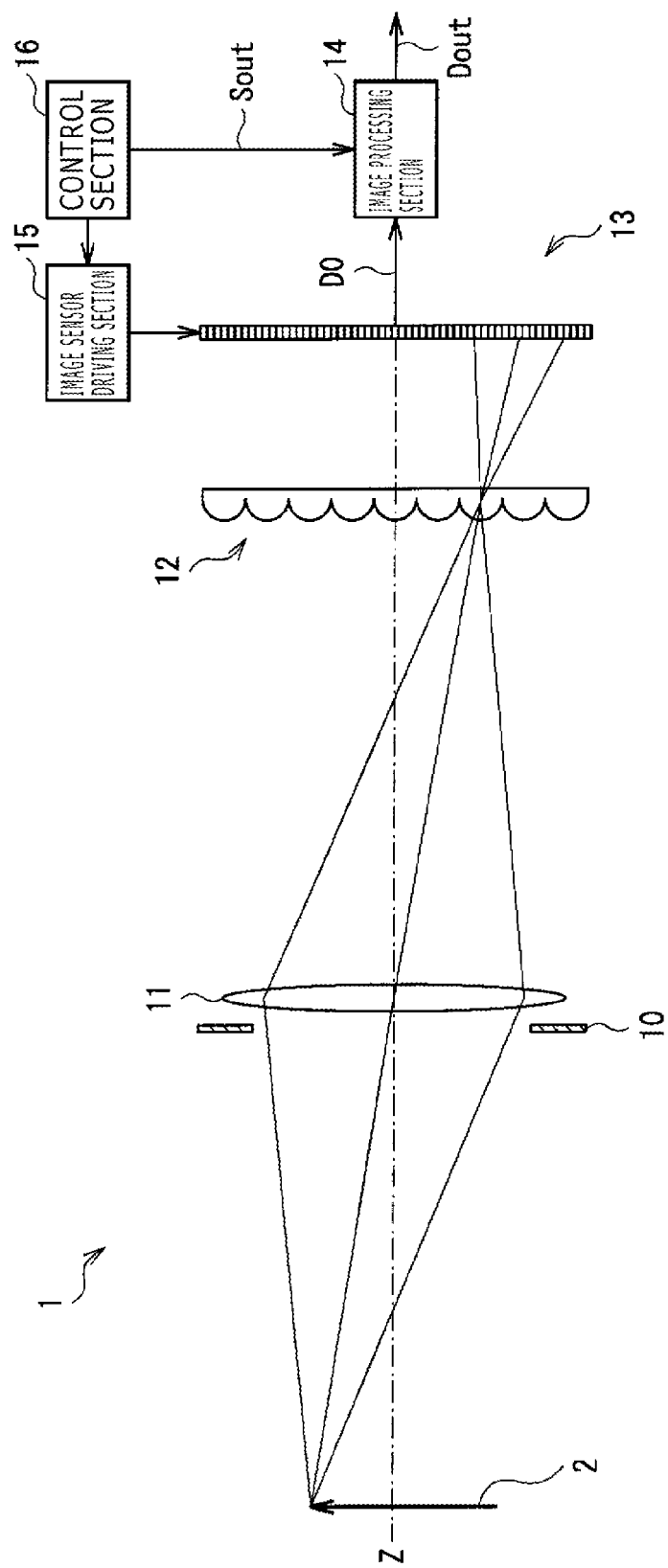
FIG. 1 is a view showing a general configuration of an image pickup apparatus according to an embodiment of the technology disclosed herein.

FIG. 1 shows a general configuration of an image pickup apparatus 1 according to an embodiment of the disclosed technology. The image pickup apparatus 1 is a monocular type camera for picking up an image using a single image pickup lens. The image pickup apparatus 1 picks up an image of an image pickup object 2, carries out a predetermined image process for the picked up image pickup object 2 and outputs image data Dout as a viewpoint image. The image pickup apparatus 1 includes an image pickup lens 11, a lens array 12, an image sensor 13, an image processing section 14, an image sensor driving section 15 and a control section 16. It is to be noted that, in the following description, an optical axis is represented by Z, and in a plane orthogonal to the optical axis Z, a horizontal direction and a vertical direction are represented by X and Y, respectively. Further, since the image processing method of the disclosed technology is implemented by a configuration and operation of the image processing section 14, description of the image processing method is omitted herein.

The image pickup lens 11 is a main lens for picking up an image of an image pickup object 2 and is configured from a general image pickup lens used, for example, for a video camera or a still camera. A diaphragm 10 is disposed on the light incoming side of the image pickup lens 11 but may alternatively be disposed on the light outgoing side.

The lens array 12 is disposed on a focal plane or image formation plane of the image pickup lens 11 and is configured by two-dimensionally disposing a plurality of lenses or micro lenses 12a along the X direction and the Y direction on a substrate configured, for example, from glass. Each of the lenses 12a is configured from a resin material such as a photoresist and is formed using, for example, a resist reflow method or a nanoimprint method on a substrate configured from glass or plastic. Or, the lenses 12a may be formed by carrying out an etching process for the surface of the substrate. The image sensor 13 is disposed on the focal plane of the lens array 12.

The image sensor 13 receives a ray of light passing through the lens array 12 to acquire image pickup data D0. In the image sensor 13, a plurality of pixels are disposed in a matrix along the X and Y directions. The image sensor 13 is configured from a solid-state image pickup device such as a CCD (Charge Coupled Device) device or a CMOS (Complementary Metal-Oxide Semiconductor) device.

Figure 2:
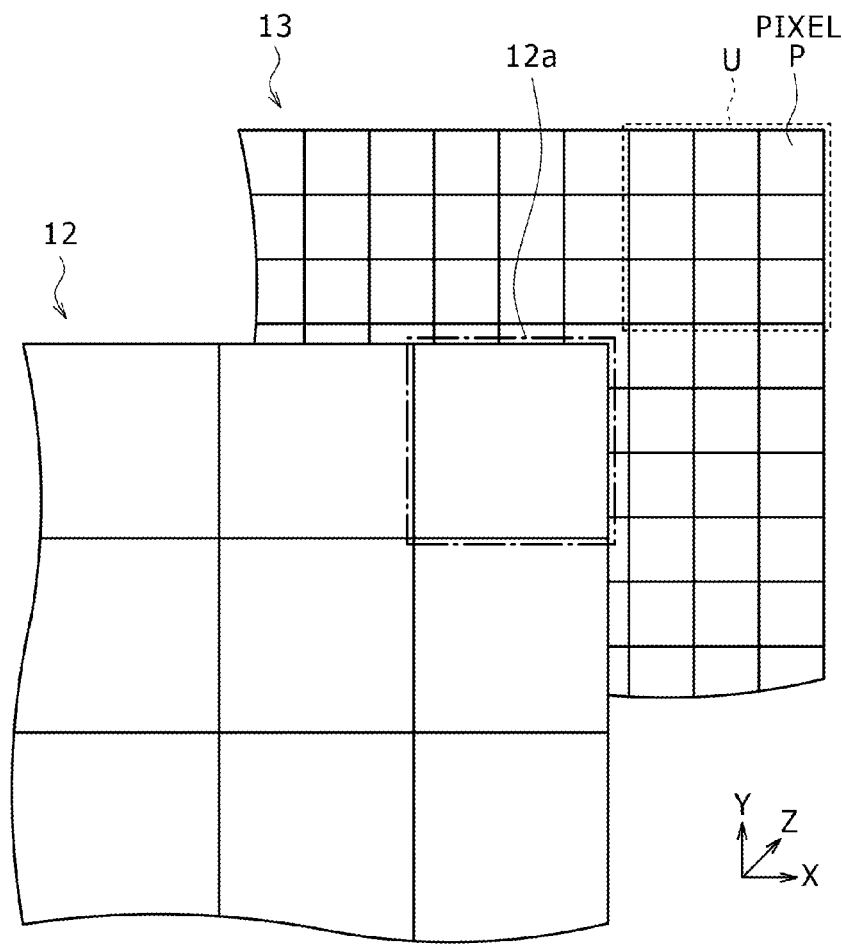
FIG. 2 is a schematic view illustrating a disposition relationship of a lens array and an image sensor.

FIG. 2 schematically illustrates a disposition configuration of the lens array 12 and the image sensor 13. Referring to FIG. 2, the lens array 12 and the image sensor 13 are disposed in a spaced relationship from each other by a predetermined distance, particularly by a focal distance of the lens array 12, along the optical axis Z such that m×n pixel regions U in the image sensor 13 are allocated to one lens 12a. The shape of the lens 12a on an XY plane is a square shape, for example, same as that of the m×n pixel region U. It is to be noted that m and n are integers equal to or greater than 1, and as the value of m×n increases, that is, as the number of pixels to be applied to one microlens increases, the viewpoint image number or number of visual points increases. On the other hand, as the pixel number allocated to each lens decreases, that is, as the value of m×n decreases, the pixel number or resolution of the viewpoint image increases. In this manner, the number of visual points and the resolution of the viewpoint image have a tradeoff relationship to each other. In the following, description is given taking a case in which a pixel region U of 3×3 pixels (m=n=3) is allocated to one lens 12a as an example.

On a light receiving face of the image sensor 13, a color filter not shown may be provided. For the color filter, a color filter of the type can be used wherein filters for the colors of, for example, red (R), green G and blue B are arrayed at a ratio of, for example, 1:2:1 as known as Bayer array.

Figure 3:
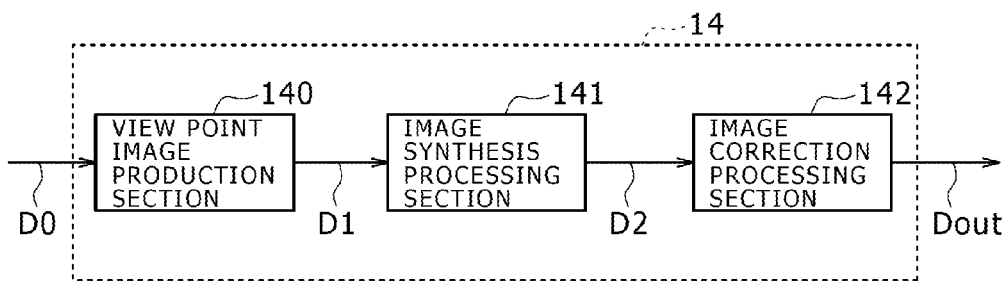
FIG. 3 is a functional block diagram showing a detailed configuration of an image processing section shown in FIG. 1.

The image processing section 14 carries out a predetermined image process for the picked up image data D0 acquired by the image sensor 13 and outputs image data Dout, for example, as viewpoint images. FIG. 3 shows a detailed configuration of the image processing section 14. Referring to FIG. 3, the image processing section 14 includes, for example, a viewpoint image production section 140, an image synthesis processing section 141 and an image correction processing section 142. Particular image processing operation of the image processing section 14 is hereinafter described.

The image sensor driving section 15 drives the image sensor 13 to control exposure, readout and so forth of the image sensor 13.

The control section 16 controls operation of the image processing section 14 and the image sensor driving section 15 and is configured, for example, from a microcomputer.

Working Effect

1. Acquisition of Picked Up Image Data

Figure 4:
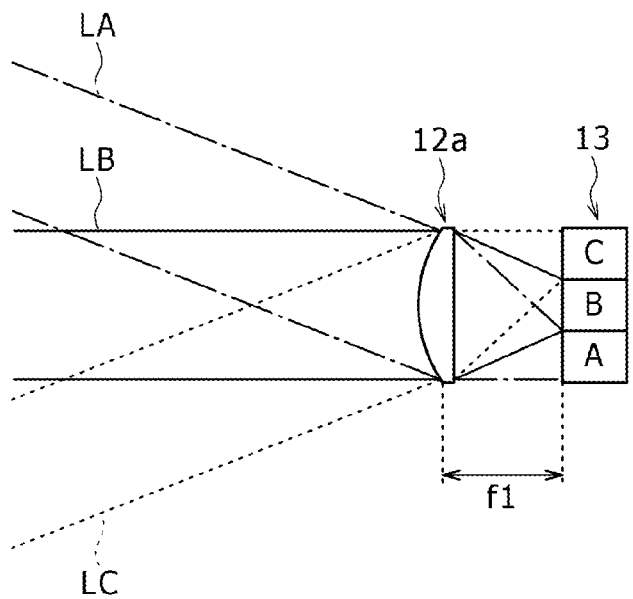
FIG. 4 is a schematic view illustrating light ray division in viewpoint directions.

In the image pickup apparatus 1, since the lens array 12 is provided at a predetermined position between the image pickup lens 11 and the image sensor 13, the image sensor 13 records a ray of light from an image pickup object 2 as a light ray vector which retains information regarding an advancing direction of the light ray, that is, a viewpoint direction, in addition to an intensity distribution of the light ray. In particular, a ray of light passing through the lens array 12 is divided for each viewpoint direction of the visual point and received by different pixels of the image sensor 13. For example, as seen in FIG. 4, from within a ray of light passing through the lens 12a, a light ray or light flux LA from a direction of a certain viewpoint, that is, of a first visual point, is received by a pixel "A." Meanwhile, light rays or light fluxes LB and LC from directions from visual points, that is, from second and third visual points, different from the direction of the certain visual point are received by pixels "B" and "C," respectively. In this manner, in the pixel region U allocated to the lens 12a, light rays from different visual point directions from each other are received by different pixels. In the image sensor 13, readout is carried out line-sequentially in response to driving operation by the image sensor driving section 15, and picked up image data D0 are acquired.

Figure 5:
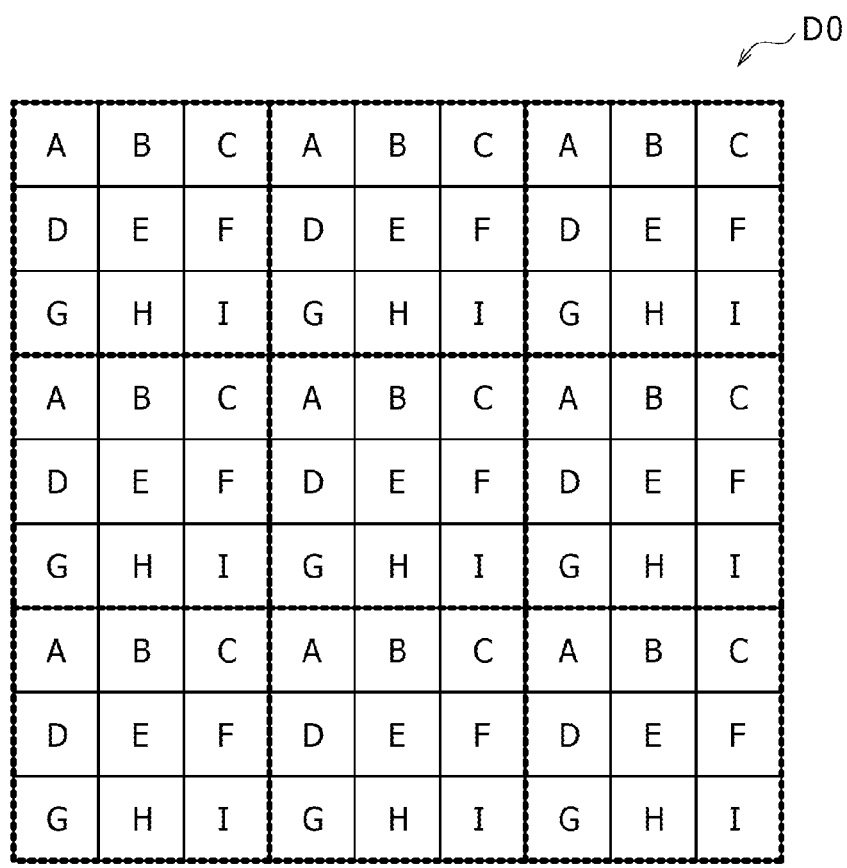
FIG. 5 is a schematic view illustrating picked up image data acquired by the image pickup apparatus of FIG. 1.

FIG. 5 schematically illustrates a pixel data array of the picked up image data D0. In the case where a pixel region U of 3×3 pixels is allocated to one lens 12a as in the present embodiment, light rays from totaling nine visual point directions are received for each pixel region U, and A to I pixel data of 3×3 pixels are acquired. It is to be noted that, in FIG. 5, picked up image data obtained from 9×9 pixel regions of 3×3 pixels, that is, from nine pixel regions U, are illustrated. Further, in the case where a color filter is disposed on the light receiving face side of the image sensor 13, the picked up image data D0 are recorded as color data corresponding to the color array of the color filter. The picked up image data D0 obtained in such a manner as described above are outputted to the image processing section 14.

2. Production of a Viewpoint Image

Referring to FIG. 3, the image processing section 14 includes a viewpoint image production section 140, an image synthesis processing section 141 and an image correction processing section 142. The image processing section 14 carries out a predetermined image process based on the picked up image data D0 outputted from the image sensor 13 and outputs image data Dout as a viewpoint image.

In particular, the viewpoint image production section 140 first carries out a process of producing a plurality of viewpoint images based on the picked up image data D0. In particular, the viewpoint image production section 140 synthesizes those of the picked up image data D0 illustrated in FIG. 5 which belong to the same visual point directions, that is, which are extracted from those pixels positioned at the same positions of the pixel regions U. For example, the viewpoint image production section 140 extracts, from among the picked up image data D0, all pixel data "A" and synthesizes the extracted pixel data as seen in FIG. 6A. Similar processing is carried out also for the other pixel data "B" to "I" as seen in FIGS. 6B to 6I. In this manner, the viewpoint image production section 140 produces a plurality of viewpoint images, here, nine viewpoint images of the first to ninth visual points, based on the picked up image data D0. The viewpoint images are outputted as viewpoint image data D1 to the image synthesis processing section 141.

3. Image Synthesis Process

The image synthesis processing section 141 carries out such an image synthesis process as described below for a plurality of viewpoint images of the viewpoint image data D1 inputted thereto.

Viewpoint images R1 to R9 shown in FIGS. 7A to 7I are a particular example of viewpoint images corresponding to the data array of FIGS. 6A to 6I. Here, an image of an image pickup object 2 is described taking images Ra, Rb and Rc of three image pickup objects "person," "mountain" and "flower" disposed at positions different from each other in the depthwise direction are given as an example. The viewpoint images R1 to R9 are picked up such that the "person" from among the through image pickup objects are focused by the image pickup lens, and the image Rb of the "mountain" positioned on the interior side with respect to the "person" and the image Rc of the "flower" positioned on this side with respect to the "person" are in a defocused state. Since the viewpoint images R1 to R9 are picked up by a camera of a monocular camera having a single image pickup lens, even if the visual point varies, the image Ra of the "person" on the focus plane does not shift. However, the defocused images Rb and Rc are shifted to positions different from each other. It is to be noted that, in FIGS. 7A to 7I, the position shifting between different viewpoint images, that is, the position shifting of the images Rb and Rc, is illustrated in an exaggerated form.

Figure 7C:
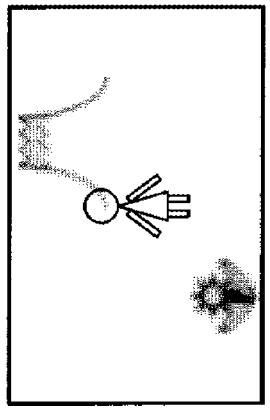
FIGS. 7A to 7I are schematic views showing an example of viewpoint images corresponding to the viewpoint image data illustrated in FIGS. 6A to 6I.
Figure 7F:
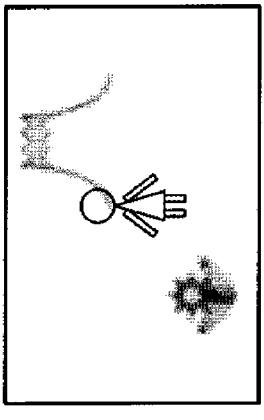
Figure 7I:
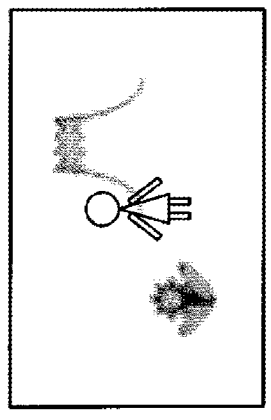
Figure 7B:
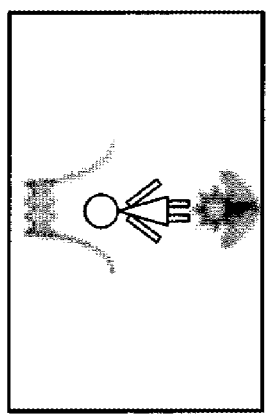
Figure 7E:
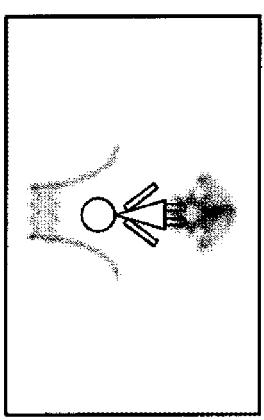
Figure 7H:
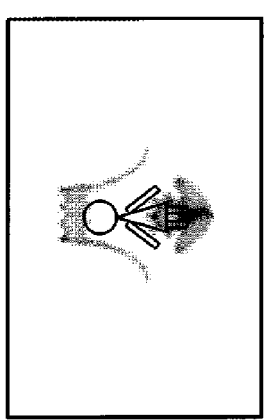
Figure 7A:
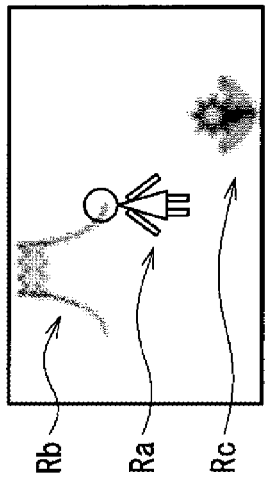
Figure 7D:
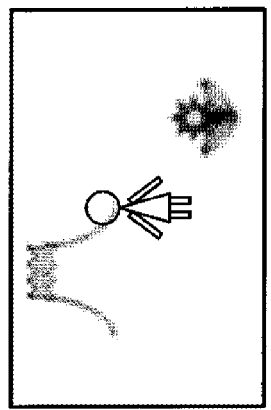
Figure 7G:
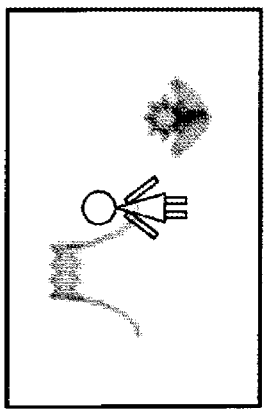
Figure 8A:
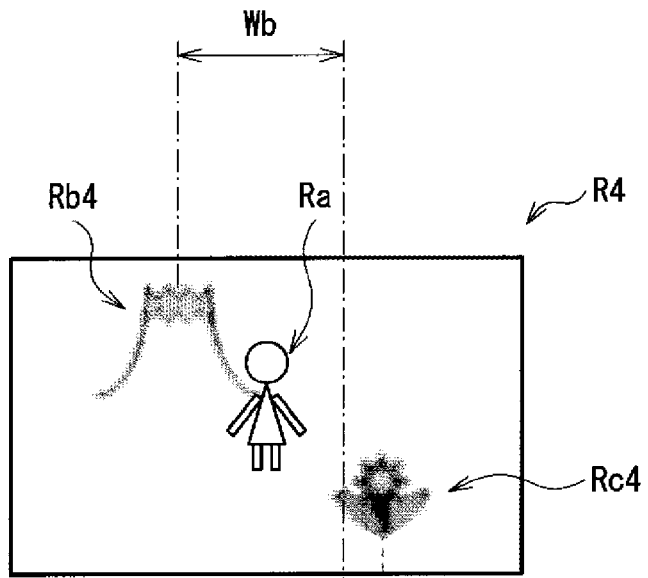
FIGS. 8A and 8B are schematic views showing a parallax amount between viewpoint images.
Figure 8B:
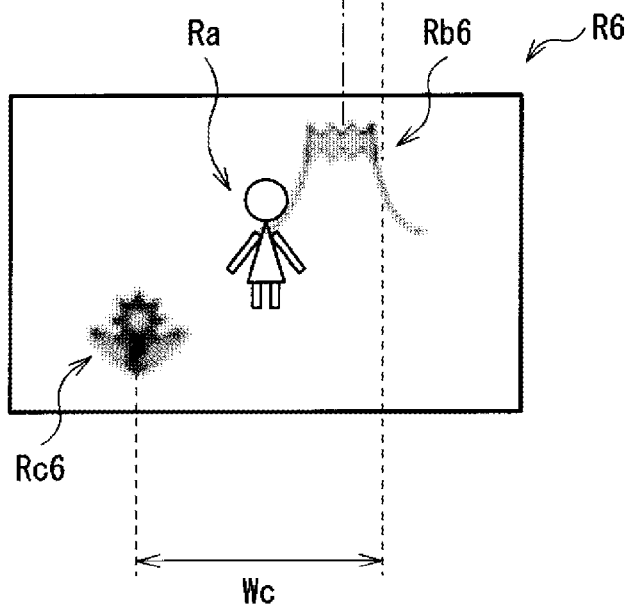

When, for example, two left and right viewpoint images from among such nine viewpoint images R1 to R9 as described above are used to carry out stereoscopic image display, the stereoscopic effect of a video displayed corresponds to the amount of parallax between the two viewpoint images. For example, if a viewpoint image R4 shown in FIG. 7D and a viewpoint image R6 shown in FIG. 7F are selected as the two viewpoint images described above, then the stereoscopic effect of the display video is such as described below. For example, although the "mountain" looks on the interior side with respect to the "person," the degree of such looking corresponds to the positional displacement amount or parallax amount Wb between an image Rb4 in the viewpoint image R4 and an image Rb6 in the viewpoint image R6 as seen in FIGS. 8A and 8B. On the other hand, although the "flower" looks protruding to this side with respect to the "person," the degree of such looking corresponds to the positional displacement amount Wc between an image Rc4 in the viewpoint image R4 and an image Rc6 in the viewpoint image R6. Then, as the positional displacement amounts Wb and Wc increase, the "mountain" is observed at a position by an increasing amount on the interior side and the "flower" is observed at a position by an increasing amount on this side.

However, if such parallax amounts are excessively great, then they exceed the perceptual limitation of the human being, and the images look as doubled images and are not recognized as stereoscopic videos. Or, even if the images are recognized as stereoscopic videos, the observer is likely to feel the eyestrain by continuously observing such a video proximate to the perceptual limitation.

Therefore, in the following embodiment, in order to reduce the excessively great parallax which causes such eyestrain as described above, a process of synthesizing or adding two or more viewpoint images at predetermined synthesis rates is carried out. The process mentioned is hereinafter referred to as synthesis process. Thus, a synthesis process of two or more viewpoint images is carried out by weighting the viewpoint images. This synthesis process can be represented by the following expression (1):

$$Rn = (\alpha \times R1 + \beta \times R2 + \gamma \times R3 + \delta \times R4 + \epsilon \times R5 + \zeta \times R6 + \eta \times R7 + \theta \times R8 + \iota \times R9) \quad (1)$$

where Rn is a viewpoint image after the synthesis process, and $\alpha, \beta, \gamma, \delta, \epsilon, \zeta, \eta, \theta$ and $\iota$ are coefficients representative of synthesis rates. The coefficients may be zero. In particular, all of the viewpoint images may be synthesized or else they may be synthesized selectively. Further, such synthesis process can be carried out using any of plane data, line data and pixel data. However, since, in the present embodiment, the synthesis rates are equal among the image planes, the synthesis process is carried out collectively for the planes.

Principle of Parallax Reduction

Figure 9A:
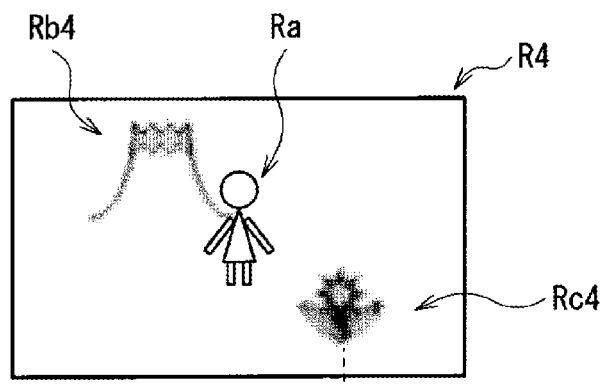
FIGS. 9A to 9C are schematic views illustrating image synthesis processing operation.
Figure 9B:
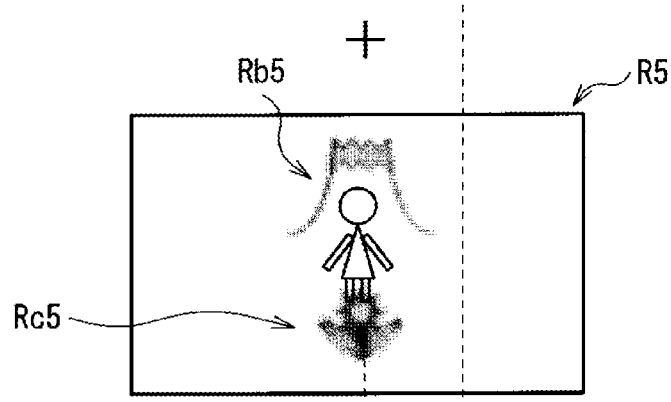
Figure 9C:
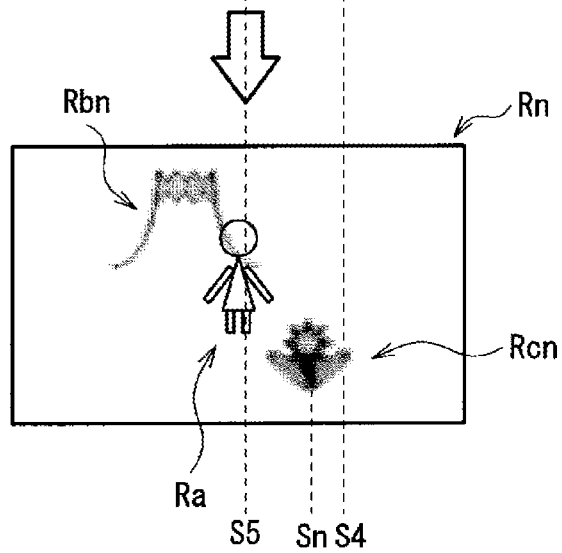

A principle of parallax reduction by such a synthesis process as described above is described below with reference to FIGS. 9A to 12C. For the simplified description, an example wherein the viewpoint image R4 and the viewpoint image R5 are to be synthesized and particularly, of the coefficients mentioned hereinabove, $\alpha, \beta, \gamma, \zeta, \eta, \theta$ and $\iota$ are zero while $\delta = 1$ and $0 < \epsilon < 1$ is described. FIGS. 9A to 9C represent a synthesis process of the viewpoint images as images. If the viewpoint image R4 and the viewpoint image R5 multiplied by the coefficient $\epsilon$ are added, then the image positions of the "mountain" and the "flower" in the defocused state are shifted. In particular, if attention is paid to the "flower," then the position of the "flower" is shifted to a position Sn between a position S4 of the image Rc4 in the viewpoint image R4 and a position S5 of the image Rc5 in the viewpoint image R5. Further, an image Rcn after the synthesis process has a contour rather blurred. This similarly applies also to the image of the "mountain," and the position of an image Rbn of the same after the synthesis process is shifted to a position between the positions of the images Rb4 and Rb5 and the image Rbn has a contour rather blurred as in a defocused state.

Figure 10A:
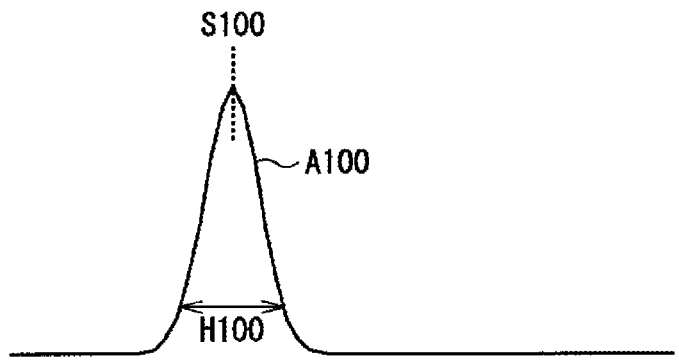
FIGS. 10A to 10C are schematic views illustrating appearances in the case where a synthesis process is carried out for viewpoint images according to a comparative example 1.
Figure 10B:
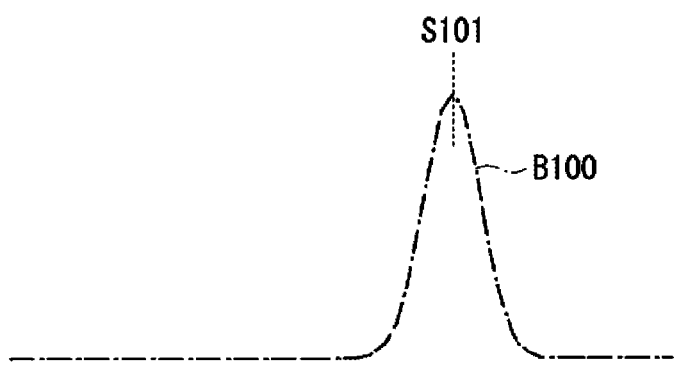
Figure 10C:
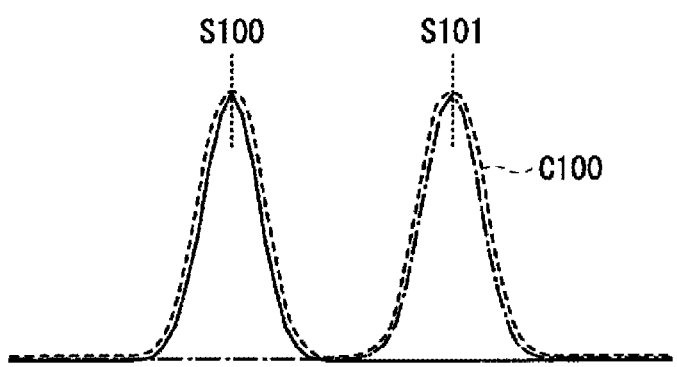

Incidentally, if viewpoint images picked up by a binocular camera are used to carry out a synthesis process similar to that described above, then it is difficult to blur an image itself while the image position is shifted as in the case illustrated in FIGS. 10A to 10C. FIGS. 10A to 10C schematically illustrate signal intensity distributions in the case where viewpoint images picked up by a binocular camera are synthesized as a comparative example with the present embodiment. In the comparative example, since an image itself is sharp also in a defocused region, in the case where viewpoint images different from each other are added, doubled images are obtained. In particular, since the width or extend H100 of the contrast is small as seen in FIGS. 10A and 10B, in the case where contrasts A100 and B100 having peaks at positions S100 and S101 different each other are synthesized, the contrast C100 after the synthesis exhibits a distribution having two peaks at different positions S100 and S101 as seen in FIG. 10C. Further, in the case where a camera of the binocular type is used, though not shown, since the position of an image of an image pickup object on the focus plane is different between the viewpoint images, it is difficult to carry out such a collective synthesis process for an entire image as in the present embodiment. In other words, a process for adjusting the image positions on the focus plane or a like process is required.

Figure 11A:
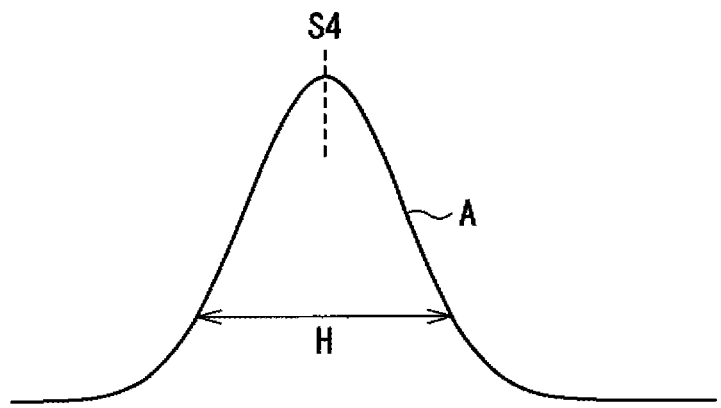
FIGS. 11A to 11C are schematic views illustrating appearances in the case where the synthesis process is carried out for viewpoint images by the image pickup apparatus of FIG. 1.
Figure 11B:
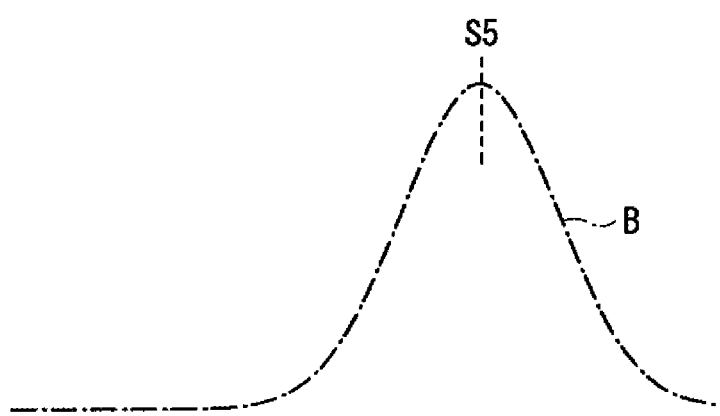
Figure 11C:
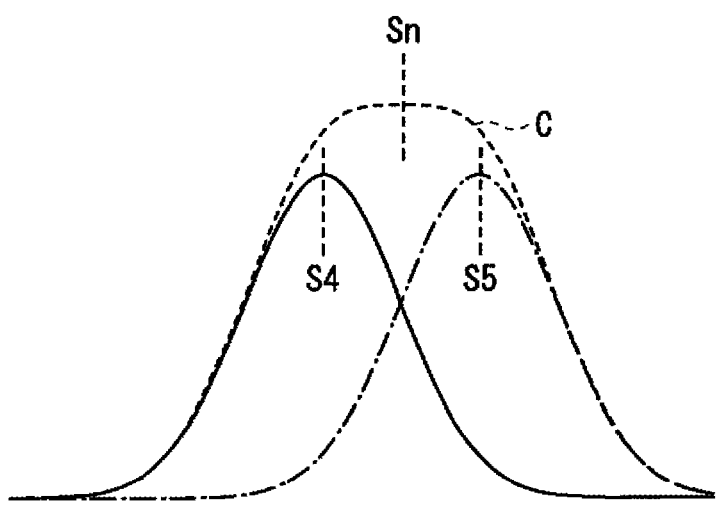

In contrast, although, in the present embodiment, it is possible to carry out position shifting and contour blurring by such a synthesis process as described above, this arises from the following reason. FIGS. 11A to 11C illustrate signal intensity distributions, that is, contrasts of contour portions of defocused images, in the case where viewpoint images acquired by the image pickup apparatus 1 are used to carry out a synthesis process. It is to be noted that, in the present example, the synthesis rates of the individual viewpoint images are equal to each other. Since, in the present embodiment, the width H of the contrast in the defocused region is great, in the case where contrasts A and B having a peak at places S4 and S5 which are different from each other and corresponding to the images Rc4 and Rc5 of the viewpoint images R4 and R5 are synthesized, a contrast C after the synthesis exhibits a more moderate distribution without causing doubled images while the peaks at the two positions disappear as seen in FIG. 11C. Accordingly, in the present embodiment, it is possible to blur the contour while the position of such a defocused image is shifted by the synthesis process. Further, different from the viewpoint images picked up by a camera of the binocular type described above, the image position of an image pickup object on the focus plane is same between the viewpoint images, and therefore, such a positioning process as in the case of the comparative example is not required in the synthesis process. In addition, since only it is necessary to weight and add produced viewpoint images, also the processing load is low.

On the other hand, FIGS. 12A to 12C schematically illustrates signal intensity distributions in the case where the synthesis rate is made different between viewpoint images in the synthesis process of the embodiment described above. Also in this instance, similarly as in the case described above, when contrasts A and B1 having peaks at places S4 and S5 different from each other and corresponding, for example, to the images Rc4 and Rc5, respectively, are synthesized particularly in the case where the (synthesis rate of R4)<(synthesis rate of R5), no doubled images appear on a contrast C1 after the synthesis. Accordingly, the contour can be blurred while the position of a defocused image is shifted. However, since the viewpoint images are individually weighted, the peak position Sn' of the contrast C1 is displaced rather to the position S5 side.

While the synthesis of two viewpoint images is described as an example, synthesis of three or more viewpoint images is carried out similarly. Further, the image position can be shifted freely within a predetermined range by making the synthesis rate different among the viewpoint images, that is, by weighting the viewpoint images. While, before the synthesis process, nine defocused images corresponding to the number of visual points are represented by different positions, by carrying out the synthesis process, it is possible to shift the image to an arbitrary position among the nine positions and blur the contour. Accordingly, an excessively great parallax can be moderated by an effect of the parallax amount suppression and an effect of blurring of an image.

Viewpoint images after such a synthesis process as described above are outputted as viewpoint image data D2 to the image correction processing section 142. The image correction processing section 142 carries out a color interpolation process such as, for example, a demosaic process, a white balance adjustment process, a gamma correction process and so forth for the viewpoint image data D2 and outputs the viewpoint image data after the image processes as image data Dout. The image data Dout may be outputted to the outside of the image pickup apparatus 1 or may be stored into a storage section not shown provided in the image pickup apparatus 1.

It is to be noted that the viewpoint image data D2 and the image data Dout may be only data corresponding to the viewpoint images produced by the synthesis process or may be data corresponding to the original viewpoint images, here the nine viewpoint images, for which the synthesis process is not carried out. Or data corresponding to the viewpoint images before and after the synthesis process may be included in a mixed state, or the original viewpoint images may be replaced by the viewpoint images produced by the synthesis process. Further, the number of viewpoint images to be produced by the synthesis process may be one or a plural number.

As described above, in the present embodiment, a plurality of viewpoint images are produced based on picked up image data D0 acquired using the image pickup lens 11, lens array 12 and image sensor 13, and two or more of the viewpoint images are synthesized. Consequently, while the position of a certain viewpoint image is shifted, the contour of the viewpoint image can be blurred. Therefore, for example, when two left and right viewpoint images are used to carry out stereoscopic image display, such an excessively great parallax as exceeds the perceptual limitation of the human being can be reduced to moderate the eyestrain and so forth by an effect provided by parallax amount suppression and blurring with regard to the viewpoint images. In other words, upon stereoscopic image display, viewpoint images which have good visibility can be acquired.

In the following, a modification to the embodiment described above is described.

<Modifications>

Figure 13:
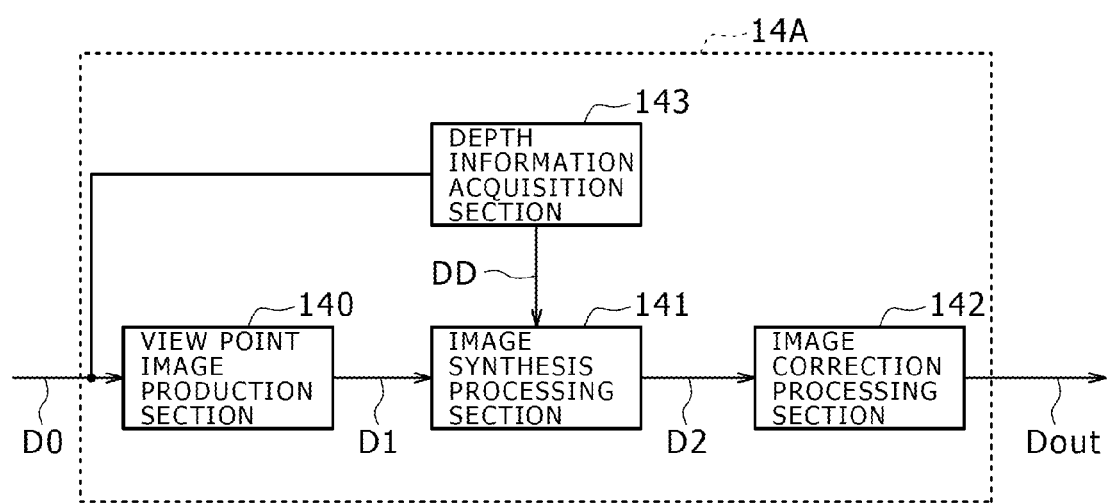
FIG. 13 is a functional block diagram showing a detailed configuration of an image processing section according to a modification to the image pickup apparatus of FIG. 1.

FIG. 13 shows an example of a detailed configuration of an image processing section 14A according to a modification to the embodiment. Referring to FIG. 13, similarly to the image processing section 14 of the embodiment described hereinabove, the image processing section 14A carries out a predetermined image process for picked up image data D0 acquired by the image pickup lens 11, lens array 12 and image sensor 13 and outputs image data Dout. However, in the present modification, the image processing section 14 includes a depth information acquisition section 143 in addition to the viewpoint image production section 140, image synthesis processing section 141 and image correction processing section 142. The image synthesis processing section 141 carries out a synthesis in response to depth information.

In particular, in the image processing section 14A, the viewpoint image production section 140 first produces a plurality of viewpoint images similarly as in the first embodiment described hereinabove based on picked up image data D0. For example, the viewpoint image production section 140 produces viewpoint images R1 to R9 of first to ninth visual points and outputs viewpoint image data D1.

Meanwhile, the depth information acquisition section 143 acquires depth information, for example, information representative of the depth of an image pickup object such as a disparity map, from the picked up image data D0. In particular, the depth information acquisition section 143 calculates a disparity, that is, a phase difference or phase displacement, between a plurality of viewpoint images for each pixel, for example, by a stereo matching method, and produces a map wherein the calculated disparities are associated with the individual pixels. It is to be noted that the disparity map is not such a disparity map produced based on a unit of a pixel as described above but may be a disparity map wherein disparities determined for individual pixel blocks each formed from a predetermined number of pixels are associated with the pixel blocks. The produced disparity map is outputted as depth information DD to the image synthesis processing section 141.

Then, the image synthesis processing section 141 uses the viewpoint images R1 to R9 and the depth information DD inputted thereto to carry out a synthesis process. In particular, the image synthesis processing section 141 weights two or more of the viewpoint images R1 to R9 for each selective region in the image plane in response to the depth information DD and then carries out a synthesis process. More particularly, the image synthesis processing section 141 sets a comparatively low synthesis rate to an image of an image pickup object on the image plane positioned comparatively near to the focus plane but sets a comparatively high synthesis rate to an image of another image pickup object spaced comparatively far from the focus plane to carry out a synthesis process for each selective region.

Figure 14A:
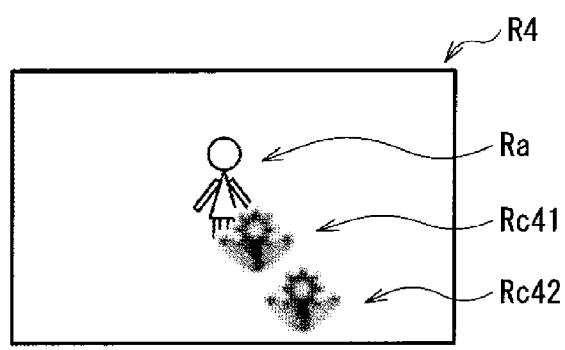
FIGS. 14A to 14C are schematic views illustrating image synthesis processing operation by the image processing section shown in FIG. 13.
Figure 14B:
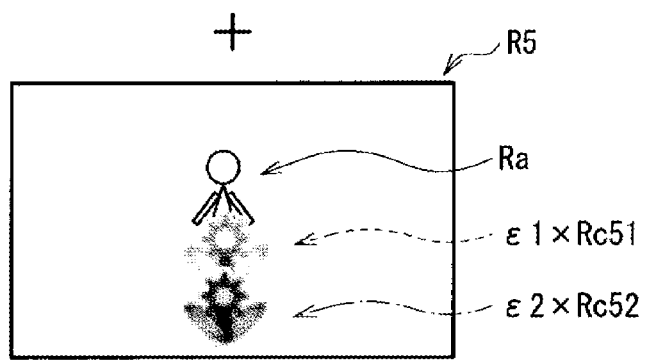
Figure 14C:
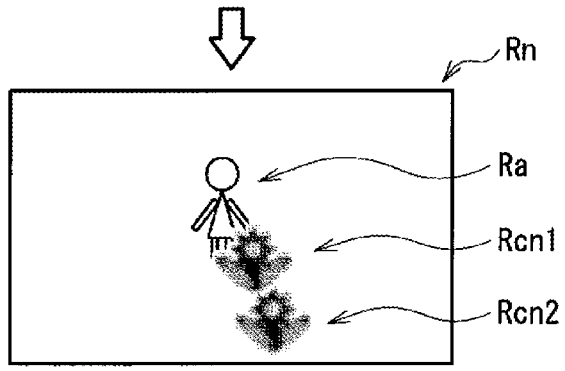

FIGS. 14A to 14C illustrate an example of an image synthesis process in the present modification. It is to be noted here that, for the simplified illustration and description, an image Ra of a "person" on the focus plane and images Rc41 and Rc42 of two "flowers" positioned on this side with respect to the "person" are shown in the figures. Further, from between the images Rc41 and Rc42, the image Rc42 is observed on this side with respect to the image Rc41. Or in other words, the image Rc42 is in a state more defocused than the image Rc41 and is an image of the "flower" displaced by a greater amount from the focus plane. In such an instance as just described, for example, when the viewpoint image R4 and the viewpoint image R5 are to be synthesized, synthesis processes for the images Rc41 and Rc42 as represented by the following expressions (2) and (3), respectively, are carried out:

$$Rc41 + \epsilon1 \times Rc51 = Rcn1 \qquad (2)$$

$$Rc42 + \epsilon2 \times Rc52 = Rcn2 \qquad (3)$$

where the synthesis rates satisfy $\epsilon1 < \epsilon2$.

Consequently, as seen in FIG. 14C, in a viewpoint image Rn after the synthesis process, the position of the image Rcn1 of the "flower" is shifted to a position between the positions of the images Rc41 and Rc51 and the contour of the image Rcn1 is blurred from the principle described hereinabove with reference to FIGS. 11A to 11C. Also the position of the image Rcn2 of the "flower" is shifted to a position between the positions of the images Rc42 and Rc52 and the contour of the image Rcn2 is blurred similarly. However, since the weighting is made different between the images Rc41 and Rc42 (E1<E2), the shift amount of the image Rcn2 is greater than that of the image Rcn1 from the principle described hereinabove with reference to FIGS. 12A to 12C. More particularly, the degree by which the position of the image Rcn2 approaches the position of the image Rc52 is higher than the degree by which the position of the image Rcn1 approaches the position of the image Rc51. Consequently, although an image spaced by a greater distance from the focus plane, that is, an image defocused by a greater amount, exhibits a greater parallax amount than the other viewpoint image, the shift amount can be increased for such a defocused image as described above. In other words, the contour of the image can be blurred while the parallax amount is suppressed in response to the parallax amount on the image plane. Consequently, for example, such a synthesis process can be carried out that, with regard to an image whose parallax amount is not very great, phase shifting or contour blurring is not carried out while position shifting and contour blurring are carried out only with regard to an image having a great parallax amount.

A plurality of viewpoint images after such synthesis process are outputted as viewpoint image data D2 to the image correction processing section 142 and are subjected to an image correction process similar to that described hereinabove and then outputted as image data Dout.

The image correction processing section 142 may carry out a synthesis process for each selective region on the image plane based on depth information as in the modification. Also in such an instance, a similar effect to that achieved by the embodiment described hereinabove can be achieved. Further, by using depth information, with regard to images of image pickup objects which are different in depth or parallax amount on the image plane, the image contour can be blurred while parallax suppression in accordance with the parallax amount is carried out. Therefore, more natural stereoscopic video image display can be implemented.

While the disclosed technology is described above in connection with the preferred embodiment and the modification, the technology is not limited to the embodiment and the modification, but further various modifications are possible. For example, while, in the embodiment described above, the number or region of lens allocation pixels is m×n=3×3 pixels, the pixel region to be allocated to each lens is not limited to this, but, for example, m and n may be 1, 2 or 4 or more.

Further, while, in the embodiment described above, a disparity map is produced as depth information and is used to carry out an image synthesis process, the depth information is not limited to such a disparity map but may be information acquired by any other method. For example, since the resolution of an image of an image pickup object differs depending upon the distance from the focus plane, the depth information of each image may be acquired based on the resolution. More particularly, since the image of the "person" on the focus plane exhibits a high resolution while the "mountain" or the "flower" is spaced from the focus plane, the image of the same is in a defocused state and exhibits a low resolution.

Further, in the embodiment and the modification described above, in an example of the image processing method of the disclosed technology, that is, in the image processing method realized by the image processing section 14, one image pickup apparatus including an image pickup lens, a lens array and an image sensor acquires picked up image data and carries out a predetermined image process based on the picked up image data. However, the picked up image data which make an object of the image process need not necessarily be acquired by one apparatus. In other words, picked up image data corresponding to a plurality of viewpoint images may be acquired from the outside, or a predetermined image process may be carried out for picked up image data acquired from the outside.

The present disclosure contains subject matter related to that disclosed in Japanese Priority Patent Application JP 2011-001401 filed in the Japan Patent Office on Jan. 6, 2011, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. An image processing apparatus, comprising:
one or more processors configured to:
receive a plurality of viewpoint images based on picked up image data acquired on the basis of a light ray passing through an image pickup lens and a lens array;
carry out weighting for each of the plurality of viewpoint images in an image plane based on depth information; and
synthesize two or more viewpoint images from the plurality of viewpoint images by using said weighting.

2. The image processing apparatus of claim 1, wherein the one or more processors are configured to synthesize the two or more viewpoint images for each of two or more respective region blocks in the image plane.

3. The image processing apparatus of claim 2, further including:
the image pickup lens;
the lens array disposed on an image formation plane of the image pickup lens; and
an image pickup device configured to receive the light ray passing through the image pickup lens and the lens array to acquire the picked up image data.

4. An image processing method, comprising:
in one or more processors:
receiving a plurality of viewpoint images based on picked up image data acquired on the basis of a light ray passing through an image pickup lens and a lens array;
performing weighting for each of the plurality of viewpoint images in an image plane based, at least in part, on depth information and
synthesizing two or more viewpoint images from the plurality of viewpoint images by using said weighting.

5. The image processing method of claim 4, wherein the plurality of viewpoint images correspond to a first region in the image plane, and wherein the method further comprises producing one or more fourth viewpoint images by synthesizing two or more third viewpoint images corresponding to a second region in the image plane.

6. The image processing method of claim 5, wherein the lens array is disposed in a focal plane of the image pickup lens.

7. An image processing apparatus, comprising:
one or more processors configured to:
perform weighting of two or more first viewpoint images based, at least in part, on depth information, the two or more first viewpoint images corresponding to an image plane and being based on picked up image data, and
produce one or more second viewpoint images by synthesizing the weighted two or more first viewpoint images,
wherein the picked up image data is acquired on the basis of a light ray passing through an image pickup lens and a lens array.

8. The image processing apparatus of claim 7, wherein the two or more first viewpoint images correspond to a first region in the image plane, and wherein the one or more processors are configured to produce one or more fourth viewpoint images by synthesizing two or more third viewpoint images corresponding to a second region in the image plane.

9. The image processing apparatus of claim 8, further including:
the image pickup lens;
the lens array disposed in a focal plane of the image pickup lens; and
an image pickup device configured to receive the light passing through the image pickup lens and the lens array to acquire the picked up image data.

* * * * *